United States Patent
Brügmann

(10) Patent No.: US 9,220,353 B2
(45) Date of Patent: Dec. 29, 2015

(54) MERCHANDISE FEED INSERT FOR A MERCHANDISE FEED SYSTEM

(75) Inventor: Lars Brügmann, Hagen (DE)

(73) Assignee: Dirk A. Brugmann Kunststoff-Verarbeitung GmbH & Co. KG (DE)

( * ) Notice: Subject to any disclaimer, the term of this patent is extended or adjusted under 35 U.S.C. 154(b) by 428 days.

(21) Appl. No.: 13/542,720

(22) Filed: Jul. 6, 2012

(65) Prior Publication Data
US 2013/0015155 A1    Jan. 17, 2013

(30) Foreign Application Priority Data
Jul. 15, 2011 (DE) .................. 10 2011 051 857

(51) Int. Cl.
A47F 5/08 (2006.01)
A47F 1/12 (2006.01)
B65G 1/02 (2006.01)

(52) U.S. Cl.
CPC .. *A47F 1/12* (2013.01); *B65G 1/023* (2013.01)

(58) Field of Classification Search
CPC ............ A47F 1/12; A47F 1/087; B65G 1/023
USPC .............. 211/59.2, 59.3, 59.4, 186, 187, 151, 211/90.1, 90.02
See application file for complete search history.

(56) References Cited

U.S. PATENT DOCUMENTS

| 3,878,344 | A | * | 4/1975 | Lockard ........................ 200/6 B |
| 3,894,634 | A | * | 7/1975 | Gotham et al. ................ 211/150 |
| 4,686,333 | A | * | 8/1987 | Hoffman et al. .............. 200/6 B |
| 5,115,920 | A | * | 5/1992 | Tipton et al. .................. 211/59.2 |
| 5,137,462 | A | * | 8/1992 | Casey et al. ...................... 439/74 |
| 6,089,385 | A |   | 7/2000 | Nozawa ........................ 211/59.2 |
| 6,533,131 | B2 | * | 3/2003 | Bada ............................ 211/59.2 |
| 6,830,146 | B1 |   | 12/2004 | Scully et al. ............... 198/836.1 |
| 2010/0072152 | A1 |   | 3/2010 | Kim |
| 2010/0133214 | A1 |   | 6/2010 | Evans |
| 2013/0068708 | A1 | * | 3/2013 | Johnson et al. .............. 211/59.3 |

FOREIGN PATENT DOCUMENTS

| WO | WO99/30597 | 6/1999 | ................ A47F 5/12 |
| WO | WO 2009/075409 A1 | 6/2009 | ................ A47F 3/14 |
| WO | WO 2009/097655 A1 | 8/2009 | ............. A47B 96/00 |

OTHER PUBLICATIONS

Office Action with International Search Report from a corresponding European Patent Application No. EP 12 16 4532, 2 pages.
Snap-Fit Joints for Plastics, Bayer Material Science (available at least as early as Apr. 10, 2011).
Snap-Fit Design Manual, BASF (2007).

* cited by examiner

*Primary Examiner* — Korie H Chan
(74) *Attorney, Agent, or Firm* — Kusner & Jaffe

(57) ABSTRACT

A merchandise feed insert for a merchandise feed system for automatic conveyance of merchandise located along the merchandise feed insert in one transport direction B to one visible edge of a shelf equipped with the merchandise feed system, the feed insert having
a set of transport rolls which are supported on a roll carrier transversely to the transport direction B;
two profile rails which can be clipped independently of one another on opposite sides of the roll carrier for holding the transport rolls on the roll carrier with at least three catch means at a time which are distributed in the transport direction along the roll carrier and/or the profile rails.

13 Claims, 1 Drawing Sheet

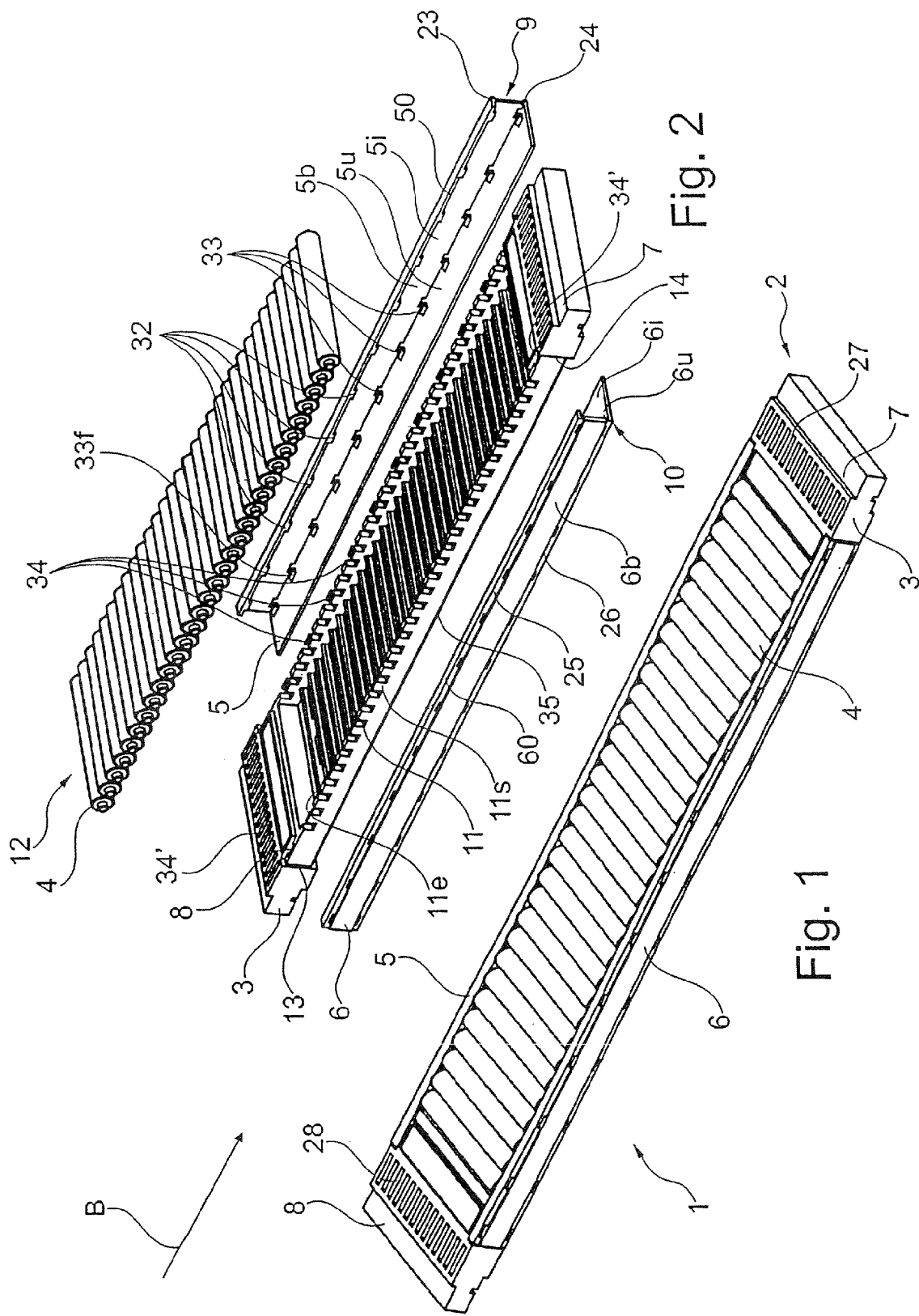

MERCHANDISE FEED INSERT FOR A MERCHANDISE FEED SYSTEM

FIELD OF THE INVENTION

The invention relates to a merchandise feed insert for a merchandise feed system (claim 8) for automatic conveyance of merchandise located along the merchandise feed insert in one transport direction B to one visible edge of a shelf equipped with the merchandise feed system as claimed in claim 1.

BACKGROUND OF THE INVENTION

Both in retail and wholesale businesses such as for example drugstores, grocery stores, discount stores, toy stores and the like, shelves are required for storing and displaying products. When products are displayed and also stored it is desirable for the respective product to be as much as possible aligned with the adjacent products on the shelf bottoms on the front so that the product is easily visible and accessible to the consumer and the arrangement of products is aesthetically pleasing. In order to implement this arrangement of products, known systems encompass the use of a pushing system to push the respective products or the row of products in the direction of the front of the shelf when the frontmost product is removed or the products are restocked.

There can be divider plates for separating adjacent rows of products.

Such a merchandise feed system is shown for example in WO 2009/097655 A1 which [consists] of a plurality of merchandise feed inserts consisting of an inner housing which holds rolls and an outer housing which holds the inner housing and two end caps which can be slipped onto the outer housing front and back and which are applied to a carrier according to FIG. 7 in a suitable arrangement. The merchandise feed takes place by tilting, therefore without the expenditure of mechanical or electrical force/energy use, specifically solely by the weight.

SUMMARY OF THE INVENTION

The object of this invention is to provide a more easily mountable merchandise feed insert which can be produced more cheaply.

This object is achieved with the features of claims 1 and 8. Advantageous developments of the invention are given in the dependent claims and all combinations of at least two of the features given in the specification, the claims and/or the figures also fall within the framework of the invention.

The basic idea of this invention is, instead of an outer housing for fixing the transport rolls on a roll carrier, to provide two profile rails which are produced especially from plastic, preferably as a plastic profile, and which can be clipped independently of one another onto the opposite sides of the roll carrier. In this invention it is especially advantageous that the merchandise feed insert can be produced from a uniform material.

On the one hand a different width of the merchandise feed insert can be implemented by the configuration as claimed in the invention on the one hand with the same profile rail so that the merchandise feed insert as claimed in the invention can be used more flexibly. On the other hand, less different material is needed for fixing of the transport roll on the roll carrier. The profile rails as claimed in the invention moreover have a lower weight than comparable profile rails with transport rolls according to the prior art. This also reduces material costs.

By a first and/or second fixing section which is located on opposite ends of the roll carrier being made integrally with the roll carrier for bringing the merchandise feed insert to the shelf according to one embodiment of the invention, the production of the merchandise feed insert is greatly simplified and becomes even more economical.

According to another embodiment of the invention it is provided that the profile rails are made as a U-profile and to hold the roll carrier in the U-profile, catch means being arranged on inside walls of the profile rails. In this way a connection as simple but effective as possible between the profile rails and the fixing section is achieved so that the roll carrier and the transport rolls are reliably held in their operating position.

In another advantageous embodiment of the invention it is provided that the catch means each consists of an upper catch projection and an opposite lower catch projection as well as corresponding snap-in elements. This measure further simplifies the merchandise feed insert as claimed in the invention in the number of parts and in this way the mounting of the merchandise feed insert is also simplified so that the production costs are reduced.

To the extent the upper catch projections are located on an upper leg of the profile rails, the mounting of the merchandise feed insert as claimed in the invention is further simplified.

In another advantageous embodiment of the invention it is provided that the upper snap-in elements corresponding to the upper catch projections are provided at least partially on, especially upper ends of, webs of transport roll holders for supporting the transport rolls. This measure further reduces the number of functional elements and greatly simplifies installation.

In particular, holding by clamping in combination with the deformation of the profile rails results in especially simple installation since no additional aids are necessary and the profile rails provide for fixing of the transport rolls in the roll carrier independently of one another.

Advantageously it is furthermore provided that the lower catch projections each have a bevel pointed toward the roll carrier for simpler installation, especially without aids.

According to another preferred embodiment of the invention it is provided that the profile rails are made flush in the first and/or second fixing section. In this way the profile rails have a plane lateral outside contour and can be easily stacked, transported and installed.

The invention furthermore relates to a merchandise feed system with at least one merchandise feed insert which is tilted to one visible edge of a merchandise feed insert in the merchandise feed system according to one of the preceding claims. The aforementioned advantages, features and embodiments also apply to the merchandise feed system as claimed in the invention.

Other advantages, features and details of the invention will become apparent from the following description of preferred exemplary embodiments and using the drawings.

BRIEF DESCRIPTION OF THE DRAWINGS

FIG. 1 shows a perspective view of one embodiment of a merchandise feed insert as claimed in the invention in the installed state and FIG. 2 shows a perspective exploded representation of one merchandise feed insert according to FIG. 1.

The same or equivalent components are identified with the same reference numbers in the figures.

DETAILED DESCRIPTION OF PREFERRED EMBODIMENTS

FIG. 1 shows a disassembled merchandise feed insert 1 as is used for example on a shelf bottom, as described according to FIG. 7 from WO 2009/097655, the disclosure of which is expressly incorporated herein by reference.

Depending on the size of the merchandise to be conveyed by one or more merchandise feed inserts 1 to one visible edge 2 in one transport direction B, different or several of the merchandise feed inserts 1 can be used. They can moreover be supported by dividers so that neater guidance of the products located on the shelves, separated for example according to merchandise groups, is easily enabled.

The merchandise feed insert 1 comprises a roll carrier 3 for accommodating a set of transport rolls 4 which are supported in the roll carrier 3 in corresponding transport roll receivers 11.

The transport rolls 4 are located transversely to the transport direction B and both the roll carrier 3 and also the transport rolls 4 are advantageously formed from plastic in order on the one hand to enable low-friction and on the other easy conveyance. Moreover the production of the roll carrier 3 and the transport rolls 4 from plastic is economically possible.

The transport rolls 4 form a roll path 12 and due to the slanted arrangement of the merchandise feed insert 1 on the carrier, products which have been placed on the roll path 12 are automatically transported to the visible edge 2. No force need be expended for this purpose.

The transport rolls 4 consist of a cylindrical transport section 4f with a constant diameter D and with bearing pins 4s which are molded onto the opposite ends 4e with a diameter d for engaging opposite transport roll receivers 11. Laterally in and opposite the transport direction B there are webs 11s for limiting the motion of the transport rolls 4 whose upper end 11e ends roughly flush with the bearing pins 4s.

So that the transport rolls 4 are secured in the transport roll receivers 11, profile rails 5, 6 with a U-profile can be clipped laterally on the roll carrier 3 such that the transport rolls 4 are fixed in the respective transport roll receiver 11 such that the transport rolls 4 rotate freely, but cannot spring out of their transport roll receiver 11. The profile rails 5, 6 are advantageously made as plastic profile.

The roll carrier 3 on the two ends of the roll path 12 which are opposite in the transport direction B each has one fixing section 7, 8 which are made especially axisymmetrically to the roll path and are molded in one piece on the roll carrier 3.

For mounting purposes the profile rails 5, 6 are clipped transversely to the transport direction B onto the roll carrier 3, the profile rails 5, 6 adjoining flush the stops 13, 14 of fixing sections 7,8 which are aligned opposite one another. The profile rails 5, 6 are each flush with the sides of the fixing sections 7, 8.

The profile rails 5, 6 have several upper catch projections 32 located on one inner wall 5i, 6i of the U-shaped profile of the profile rails 5, 6 as well as lower catch projections 33 located opposite them in the U-shaped profile as catch means. They can be snapped into corresponding upper and lower snap-in elements 34, 35 (catch means) which are arranged distributed along the sides of the roll carrier 3. In the illustrated embodiment there are twelve upper and twelve lower catch projections 32, 33 on each profile rail 5, 6 and twelve upper and lower snap-in elements 34, 35 on the two opposite sides of the roll carrier 3.

The upper catch projections 32 are each molded on the short upper leg 5o, 6o of the profile rails 5, 6 while the lower catch projections 33 are molded on the long outer leg 5u, 6u of the profile rails 5, 6. The bottoms 5b, 6b each connect the two legs 5o, 6o, 5z, 6u.

The upper snap-in elements 34 are provided mainly (except for the front and back upper snap-in elements 34') on the upper ends 11e of the webs 11s as offsets which point to the roll path 12 and behind which the upper catch projections 32 extend. Here it is advantageous to form only each n-th (here: each third) of the webs 11s, especially at least every other one, as catch means.

Mounting takes place by slanted seating of the upper catch projections 32 of the profile rails 5, 6 on the respective upper snap-in elements 34. Then the profile rails 5, 6 with the catch projections 32 snapped in are rotated such that the lower catch projections 33 which are provided with bevels 33f lock over the lower snap-in elements 35 in the form of a continuous offset. The lower legs 5u, 6u of the U-profiles are made longer and are used as levers so that the profile rails 5, 6 can be detached again by lifting the lower legs 5u, 6u.

For this purposes the lower catch projections 33 must be lifted over the lower snap-in elements 35.

The bottom 5b of the profile rail 5 at the same time forms profiling 9 on the side opposite the U-profile for accommodating the roll carrier 3, the profiling 9 in the illustrated embodiment having two side cheeks 23, 24 which are flush with the legs 5o, 6o, 5u, 6u.

The bottom 6b of the profile rail 6 forms profiling 10 which corresponds to the profiling 9 by the bottom 6b coming into contact with the bottom 5b' of a corresponding merchandise feed insert 1'. The profiling 10 in this respect has recesses 25, 26 which correspond to the side cheeks 23, 24, here in the form of offsets. The profilings 9 and 10 are made as tongue and groove connection in this exemplary embodiment.

Except for the profilings 9, 10, the profile rails 5, 6 are made symmetrically to one another. Based on the configuration as independent profile rails 5, 6, the roll carrier 3 and the roll path 12 can have different widths.

The first and second fixing sections 7, 8 have a plurality of divider holders 27, 28 which are arranged flush to one another and transversely to the transport direction B along the first and second fixing sections 7, 8. Corresponding divider holders 27, 28 are provided with corresponding identifications for easier assignment of the divider holders 27, 28 which correspond at the time.

Having described the invention, the following is claimed:

1. A merchandise feed insert for a merchandise feed system for automatic conveyance of merchandise located along the merchandise feed insert in one transport direction B to one visible edge of a shelf equipped with the merchandise feed system with the following features:
   a set of transport rolls which are supported on a roll carrier transversely to the transport direction B;
   two profile rails which can be clipped independently of one another on opposite sides of the roll carrier for holding the transport rolls on the roll carrier with at least three catch means at a time which are distributed in the transport direction along the roll carrier and/or the profile rails,
   wherein the catch means each includes an upper catch projection and an opposite lower catch projection as well as corresponding snap-in elements, and
   wherein the roll carrier includes a plurality of roll receivers for supporting the transport rolls, a web disposed between adjacent roll receivers and an upper snap-in element formed in an upper end of the web, wherein each upper snap-in element is dimensioned to engage the corresponding upper catch projection.

2. The merchandise feed insert as claimed in claim 1, wherein a first and/or second fixing section which is located on opposite ends of the roll carrier is/are made integrally with the roll carrier for bringing the merchandise feed insert to the shelf.

3. The merchandise feed insert as claimed in claim 1, wherein the profile rails are made as a U-profile and to hold the roll carrier in the U-profile, the catch means being arranged on inside walls of the profile rails.

4. A merchandise feed insert for a merchandise feed system for automatic conveyance of merchandise located along the merchandise feed insert in one transport direction B to one visible edge of a shelf equipped with the merchandise feed system with the following features:
  a set of transport rolls which are supported on a roll carrier transversely to the transport direction B;
  two profile rails which can be clipped independently of one another on opposite sides of the roll carrier for holding the transport rolls on the roll carrier with at least three catch means at a time which are distributed in the transport direction along the roll carrier and/or the profile rails,
  wherein the catch means each includes an upper catch projection and an opposite lower catch projection as well as corresponding snap-in elements, and
  wherein at least one profile rail includes the lower catch projections, the lower catch projections each having a bevel pointed toward the roll carrier.

5. The merchandise feed insert as claimed in claim 4, wherein a first and/or second fixing section which is located on opposite ends of the roll carrier is/are made integrally with the roll carrier for bringing the merchandise feed insert to the shelf.

6. The merchandise feed insert as claimed in claim 4, wherein the profile rails are made as a U-profile and to hold the roll carrier in the U-profile, the catch means being arranged on inside walls of the profile rails.

7. A merchandise feed insert for a merchandise feed system for automatic conveyance of merchandise located along the merchandise feed insert in one transport direction B to one visible edge of a shelf equipped with the merchandise feed system with the following features:
  a set of transport rolls which are supported on a roll carrier transversely to the transport direction B;
  two profile rails which can be clipped independently of one another on opposite sides of the roll carrier for holding the transport rolls on the roll carrier with at least three catch means at a time which are distributed in the transport direction along the roll carrier and/or the profile rails,
  wherein at least one profile rail includes an upper leg having upper catch projections disposed thereon, and
  wherein the roll carrier includes a plurality of roll receivers for supporting the transport rolls, a web disposed between adjacent roll receivers and an upper snap-in element formed in an upper end of the web, wherein each upper snap-in element is dimensioned to engage the corresponding upper catch projection.

8. The merchandise feed insert as claimed in claim 7, wherein a first and/or second fixing section which is located on opposite ends of the roll carrier is/are made integrally with the roll carrier for bringing the merchandise feed insert to the shelf.

9. The merchandise feed insert as claimed in claim 7, wherein the profile rails are made as a U-profile and to hold the roll carrier in the U-profile, the catch means being arranged on inside walls of the profile rails.

10. A merchandise feed insert for a merchandise feed system for automatic conveyance of merchandise located along the merchandise feed insert in one transport direction B to one visible edge of a shelf equipped with the merchandise feed system with the following features:
  a set of transport rolls which are supported on a roll carrier transversely to the transport direction B;
  two profile rails which can be clipped independently of one another on opposite sides of the roll carrier for holding the transport rolls on the roll carrier with at least three catch means at a time which are distributed in the transport direction along the roll carrier and/or the profile rails, and
  wherein at least one profile rail includes lower catch projections, the lower catch projections each having a bevel pointed toward the roll carrier.

11. The merchandise feed insert as claimed in claim 10, wherein a first and/or second fixing section which is located on opposite ends of the roll carrier is/are made integrally with the roll carrier for bringing the merchandise feed insert to the shelf.

12. The merchandise feed insert as claimed in claim 10, wherein the profile rails are made as a U-profile and to hold the roll carrier in the U-profile, the catch means being arranged on inside walls of the profile rails.

13. The merchandise feed insert as claimed in claim 10, wherein at least one profile rail includes an upper leg having upper catch projections disposed thereon.

* * * * *